United States Patent [19]

Helie

[11] Patent Number: 4,953,883

[45] Date of Patent: Sep. 4, 1990

[54] TRUCK TRAILER HITCH

[76] Inventor: Simon Helie, 500, Rivière Baionne Sud, Berthierville (Quebec), Canada, J0K 1A0

[21] Appl. No.: 344,242

[22] Filed: Apr. 26, 1989

[51] Int. Cl.$^5$ .......................... B60D 1/04; B60D 1/26
[52] U.S. Cl. ...................... 280/477; 280/479.1
[58] Field of Search ............... 280/479.1, 477, 476.1, 280/504, 515

[56] References Cited

U.S. PATENT DOCUMENTS

| 665,294 | 1/1901 | Williams | 280/486 |
|---|---|---|---|
| 2,760,789 | 8/1956 | Wampler | 280/515 |
| 2,791,443 | 5/1957 | Allard | 280/477 |
| 2,804,315 | 8/1957 | Guye | 280/477 |
| 3,052,487 | 9/1962 | Harbers et al. | 280/506 |
| 3,319,977 | 5/1967 | Quanot et al. | 280/477 |
| 3,565,459 | 2/1971 | Reid | 280/477 |
| 3,649,048 | 3/1972 | Garnett | 280/479.1 |
| 3,727,958 | 4/1973 | Peters | 403/31 |
| 3,891,239 | 6/1975 | Leo et al. | 280/479.1 |
| 4,225,149 | 9/1980 | Koopman | 280/477 |
| 4,389,058 | 6/1983 | Cadwell | 280/479.1 |
| 4,475,741 | 10/1984 | Conrad | 280/482 |

FOREIGN PATENT DOCUMENTS

| 0236804 | 11/1964 | Austria | 280/479.1 |
|---|---|---|---|
| 1555419 | 1/1971 | Fed. Rep. of Germany | 280/479.1 |
| 0102184 | 7/1963 | Norway | 280/479.1 |
| 1077755 | 8/1967 | United Kingdom | 280/479.1 |

Primary Examiner—Mitchell J. Hill
Attorney, Agent, or Firm—Darby & Darby

[57] ABSTRACT

The trailer hitch comprises an arm mounted on a motor vehicle through a horizontal, transversal pivot, and having a rear, free end distant from the pivot and formed with an arcuate, convex surface for supporting the draw pole of the trailer. The draw pole has its front, free end provided with a coupling ring. The arm is rotated about its horizontal pivot with the arcuate surface supporting the draw pole in order to successively lift and lower the pole free end and therefore the coupling ring and thereby enable engagement of the coupling ring with an upwardly projecting pintle hook secured to the motor vehicle. Engagement of the coupling ring with the pintle hook hitches the trailer to the vehicle.

12 Claims, 3 Drawing Sheets

TRUCK TRAILER HITCH

BACKGROUND OF THE INVENTION

1. Field of the invention

The present invention relates to a trailer hitch designed for easily hitching a heavy trailer provided with a draw pole to a heavy motor vehicle, for example a truck.

In the present disclosure and in the appended claims, the term "trailer" is intended to designate any trailer, vehicle, machinery, or other equipment, wheeled or not, that can be drawn or hauled by a motor vehicle.

2. Brief Description of the Prior Art

U.S. Pat. No. 3.565.459 (REID) issued on Feb. 23, 1971, describes an automatic hitch including an inclined guide member to receive a vertical hitch pole secured to the free end of the draw pole of for example a trailer. As the tractor moves rearwardly, the hitch pole slides on the guide member to lift the hitch pole and guide it toward a jaw unit secured to the tractor and in which the hitch pole engages a pivotally mounted latch plate.

U.S. Pat. No. 4.225.149 (KOOPMAN) issued on Sept. 30, 1980, proposes a remotely operable trailer hitch including two pairs of forwardly converging guide plates forming a funnel, square in cross section and directing the coupling ring at the free end of a trailer draw pole toward an articulated J-shaped latch member, whereby the coupling ring engages the latch member upon rearward movement of the motor vehicle.

The above discussed prior art hitches are specifically designed for enabling mutual engagement of particular coupling members, namely a vertical hitch pole with a jaw unit and a coupling ring with a J-shaped latch member. They are not versatile enough to successively lift and lower the draw pole of a trailer for example to position a coupling ring on an upwardly oriented pintle hook.

OBJECT OF THE INVENTION

The principal object of the present invention is therefore to provide a trailer hitch including a pivoting arm of which one end supports the draw pole of the trailer. By rotating the arm about a substantially horizontal pivot, the position of the free end of the draw pole is controlled, whereby many types of coupling members can be engaged together. As an example, a coupling ring secured to the free end of the draw pole can be successively lifted and lowered to engage it with a pintle hook fixedly attached to a motor vehicle.

SUMMARY OF THE INVENTION

More specifically, in accordance with the present invention, there is provided a trailer hitch for hitching to a motor vehicle a trailer having a draw pole with a first end attached to the trailer and with a second, free end, comprising:

a first coupling member secured to the second end of the draw pole;

a second coupling member fixedly attached to the motor vehicle and engageable with the first coupling member to hitch the trailer to the motor vehicle;

an arm pivotally mounted on the motor vehicle through a substantially horizontal pivot, and having a free end distant from the pivot and provided with means for supporting the draw pole; and means for rotating the pivoting arm about its substantially horizontal pivot.

In operation, the pivoting arm is rotated about its pivot with the arm free end supporting the draw pole in order to control in height the position of the pole, second end and therefore of the first coupling member and thereby enable engagement of the first coupling member with the second coupling member.

Preferably, the trailer hitch further comprises means for guiding laterally the first coupling member secured to the second end of the draw pole toward the second coupling member as the motor vehicle moves toward the trailer and the draw pole slides on an arcuate, convex surface formed at the free end of the pivoting arm and constituting the above-mentioned draw pole supporting means.

In accordance with a preferred embodiment of the trailer hitch in accordance with the invention, the pivoting arm comprises a second end distant from the substantially horizontal pivot, and the arm rotating means comprises a remotely operable hydraulic cylinder with one end connected to the second end of the pivoting arm and with another end connected to the vehicle.

In accordance with the present invention, there is also provided a method of hitching to a motor vehicle to which is fixedly attached an upwardly projecting pintle hook with an upper free end, a trailer having a draw pole with a first end attached to the trailer and with a second, free end provided with a coupling ring, which hitching method comprising the steps of:

supporting the draw pole of the trailer with a pole supporting free end of an arm pivotally mounted on the motor vehicle through a substantially horizontal pivot distant from the arm free end;

rotating the pivoting arm about the pivot in a first direction of rotation with the arm free end supporting the draw pole until the coupling ring is higher than the upper free end of the pintle hook;

moving the motor vehicle toward the trailer until the coupling ring is above the pintle hook;

guiding laterally the coupling ring as the vehicle moves toward the trailer to position the coupling ring above the pintle hook;

rotating the pivoting arm about the substantially horizontal pivot in a second direction of rotation opposite to the first rotation direction to lower the coupling ring on the pintle hook and thereby engage this coupling ring with the pintle hook; and locking the coupling ring on the pintle hook;

whereby the trailer is hitched to the motor vehicle when the coupling ring is engaged with and locked on the pintle hook.

The objects, advantages and other features of the present invention will become more apparent upon reading of the following non restrictive description of a preferred embodiment thereof, given with reference to the accompanying drawings.

DETAILED DESCRIPTION OF THE PREFERRED EMBODIMENT

As illustrated in FIGS. 1a and 1b of the attached drawings, the trailer hitch according to the invention i designed to hitch a truck trailer 2 provided with a draw pole 3 to the rear of any type of trucks such as 1. In the embodiment of FIG. 1b, the pole 3 is solid with the trailer frame. In the embodiment of FIG. 1a, the pole 3 is fixed to a pivotable front bogie 4 containing two or more wheels. When the truck 1 is turning with the trailer 2 hitched thereto, the draw pole 3 turns accordingly to turn the bogie 4 whereby the trailer 2 turns to follow the truck 1. In both cases when the trailer 2 is unhitched, the free, front end of the pole 3 is positioned at a given height above the ground. This type of structure is well known in the art and accordingly will not be further elaborated. It is also given only as a non limitative example.

The preferred embodiment of the trailer hitch in accordance with the present invention will now be described in detail with reference to FIGS. 2, 3, 4 and 5 of the drawings.

Figure 5:
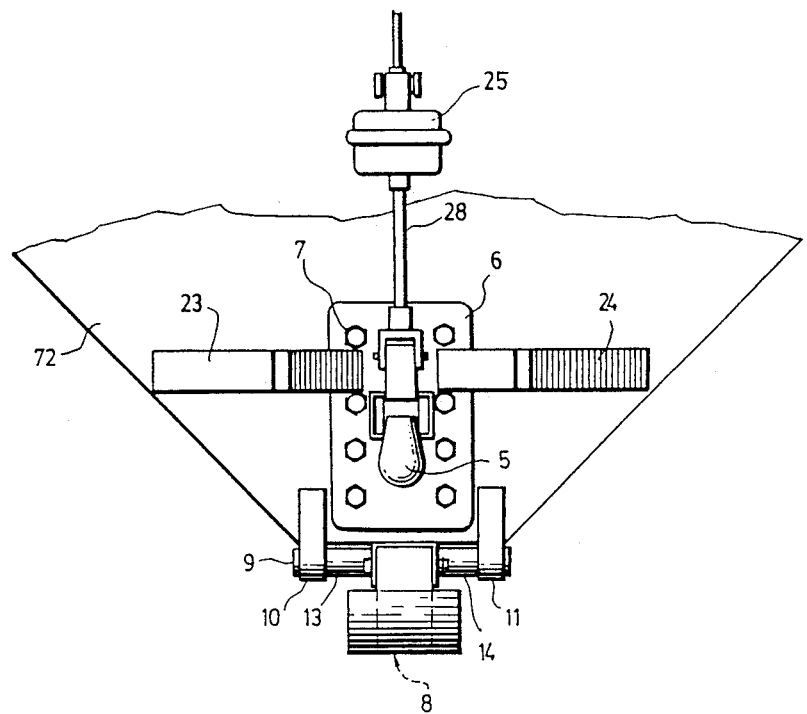
FIG. 5 is a rear view of the trailer hitch of FIGS. 2 and 3.

The draw pole 3 comprises at the front end thereof a first coupling member, namely a coupling ring 4. A second coupling member, that is an upwardly projecting pintle hook 5 is secured to the rear of the steel frame 72 of the truck 1. The hook 5 is integral with a plate 6 fastened to the truck frame 72 through a plurality of bolts such as 7 (FIG. 5). The pintle hook 5 and the plate 6 form a one-piece steel cast.

The trailer hitch further comprises an arm 8 pivotally mounted on the truck frame 72 through a horizontal, transversal pivot 9. Two ears 10 and 11 welded to the frame 72 hold the pivot 9 in position. In order to center the arm 8 on the pivot 9, two sections 13 and 14 of steel tube are mounted on the pivot 9 between the arm 8 and the ear 10, and between the same arm and the ear 11, respectively. It can be easily appreciated that the arm 8 is provided with holes through it to allow passage of the pivot 9.

The arm 8 is articulated on the pivot 9 by means of a hydraulic cylinder 15 having its rod end connected to the front end of the arm 8 through a horizontal, transversal pivot, and also having its cylinder end connected to the frame of the truck 1 again through a transversal, horizontal pivot.

As can be seen in FIGS. 2 to 5, the arm 8 is formed of a front tube section 16 square in cross section and of a rear tube section 17 also square in cross section. The cross section of the tube section 17 is smaller than that of the tube section 16 whereby front end of the tube section 17 can be inserted within the rear end of the tube section 16 and locked in position by means of a pin 18 inserted through holes bored in the two tube sections 16 and 17 and itself locked at 19. This structure presents the advantage that the rear tube section 17 can be easily installed on and removed from the front tube section 16. The rear section 17 is removed to prevent obstruction by the same during use of the truck. It is also important that the rear end of the front tube section 16 does not overstep the pintle hook 5 rearward to cause no obstruction.

Figure 2:
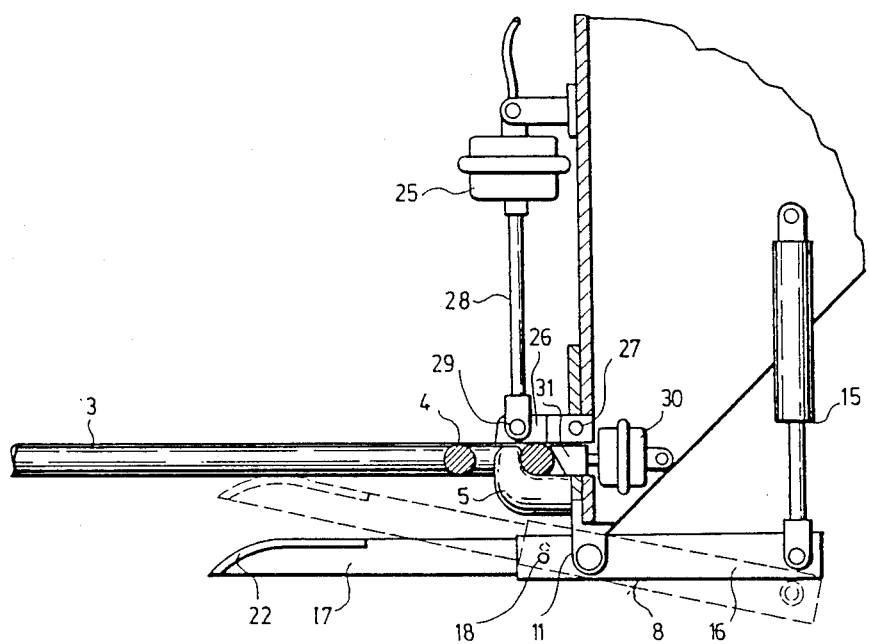
FIGS. 2 and 3 are side, elevation views of a trailer hitch in accordance with the present invention (FIG. 2 being partially cross-sectional)
Figure 3:
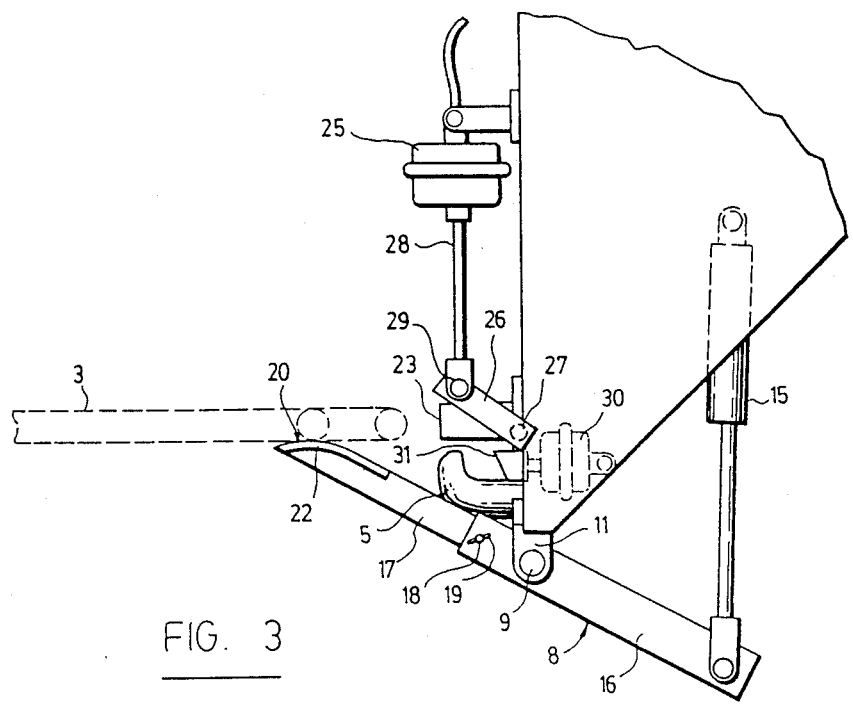

The free end of the rear tube section 17 is arcuated at 20, and widened by means of two steel plates 21 and 22 on the two sides of the tube section 17 (see FIGS. 2-3).

The plates 21 and 22 are welded to the tube section 17 and are arcuate to follow the rounded end 20 of the rear tube section 17. Alternatively, a single arcuate plate (FIG. 5) can also be welded on the free end of the tube section 17 to replace the rounded end 20 and the arcuate plates 20 and 21. In both cases, an arcuate, convex surface is provided to engage the underside of the draw pole 3 in order to support the latter pole while allowing it to slide on the arcuate surface. As can be appreciated, the arcuate end surface is wide enough to support adequately the underside of the draw pole 3 upon small, right or left lateral movements of this pole 3.

Obviously, the tube sections 16 and 17 are made of highly rigid steel capable of supporting the heavy draw pole of truck trailers.

Figure 4:
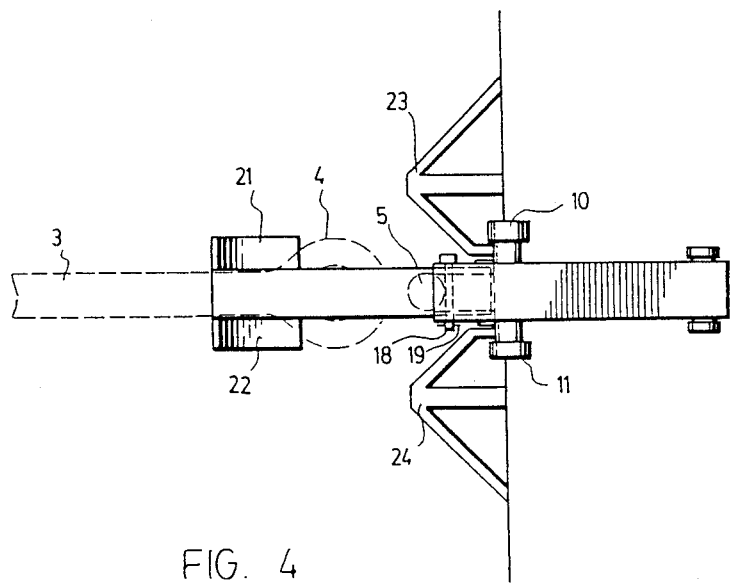
FIG. 4 is a bottom view of the trailer hitch of FIGS. 2 and 3.

Left and right guides 23 and 24 made of steel bars are welded to the frame 72 of the truck 1. As can be seen in FIGS. 4 and 5, the guides 23 and 24 define two vertical surface converging toward the pintle hook 5 to direct the ring 4 of the draw pole 3 above the pintle hook 5 when the truck 1 is moved rearwardly, that is toward the trailer 2.

To allow the pintle hook 5 to engage the ring 4, a first air motor 25 is supplied with pressurized air to "open" a locking member 26 which is pivotally attached at one end thereof to the frame of the truck through a horizontal, transversal pivot 27 located just above the pintle hook 5. This opening is achieved via a link assembly including a lever 28 pivotably mounted to a support 29 attached to the frame of the trunk, and a connection rod 32. As soon as the air pressure drops and is stopped, the motor 25 pulls the upper end of the lever 28 and causes the locking member 26 to swing in the closing position shown in FIG. 2, where it locks the ring 4 on the pintle hook 5. It is worth mentioning that the locking member 26 can be rigidly maintained in its closing position by mere adjustment of the respective position of the lever 28 and rod 32, to keep them substantially in line when the locking member is in its closing position as is shown in FIG. 2. As a result, even in case of pressure failure or leak, the member 26 remain locked over the hook 5.

In order to prevent forth and back movement of this ring 4 on the pintle hook 5, a second air motor is also supplied with pressurized air to push the slanted end of a steel block 31 on the ring 4 secured to the free end of the draw pole 3.

The operation of the trailer hitch in accordance with the present invention during hitching and unhitching will now be described in detail hereinafter.

Figure 1:
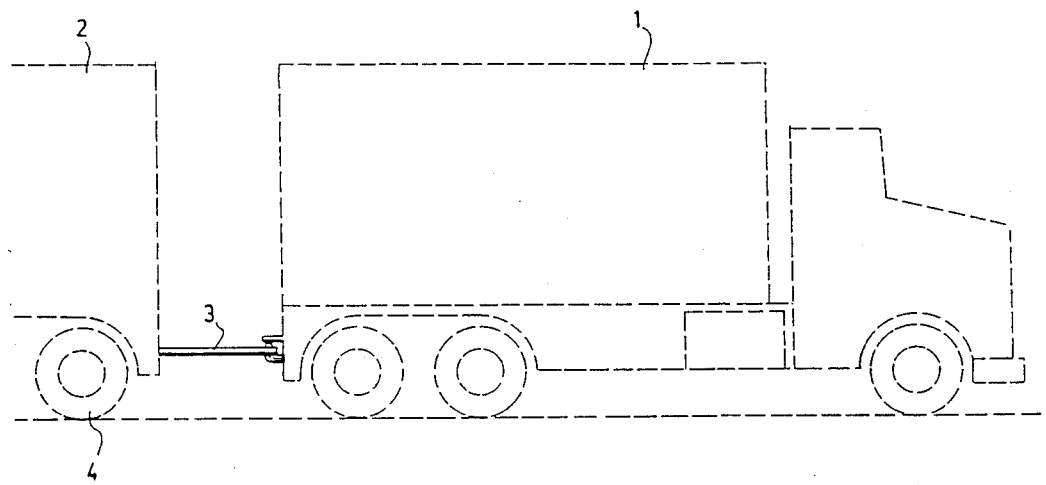
FIGS. 1a and 1b show trailers of the most conventional structures hitched to a truck through a draw pole.

In order to hitch the trailer 2 of FIG. 1 to the truck 1, the following steps are carried out:

the truck 1 is moved rearwardly toward the trailer with the cylinder 15 fully retracted in order to lower the rear, free end of the arm 8, until the arcuate, convex surface at the free end of the tube section 17 is positioned under the draw pole 3 (in accordance with the preferred embodiment of the invention, the coupling ring 4 must, when the trailer is unhitched, be lower than the upper end of the upwardly projecting pintle hook 5, but high enough to enable positionment of the arcuate surface at the free, rear end of the tube section 17 under the draw pole 3 of the trailer upon rearward movement of the truck 1, with the cylinder 15 in its fully retracted position);

the motor 25 is thereafter supplied with pressurized air to position the locking member 26 in its position shown in FIG. 3, whereby the ring 4 is free to engage the pintle hook 5;

the hydraulic cylinder 15 is then fully extended to rotate the arm 8 about the pivot 9 to lift the arcuate convex surface, the latter surface engaging the underside of the draw pole 3 to support the same and lift the coupling ring 4 at a height shown in FIG. 3;

the truck 1 is again moved rearwardly with the draw pole 3 sliding on the arcuate, convex surface at the free, rear end of the tube section 17, and with the ring 4 directed above the free upper end of pintle hook 5 by means of the guides 23 and 24;

when the ring 4 is positioned above the pintle hook 5, the cylinder 15 is retracted again whereby the ring 4 is engaged on the pintle hook 5 as shown in FIG. 2;

the motor 25 is deactivated to move the locking member 26 in the position shown in FIG. 2, whereby the ring 4 is locked on the pintle hook 5; and finally the motor 30 is supplied with pressurized air whereby the ring 4 is squeezed between the pintle hook 5 and the slanted surface of the steel block 31 to prevent any forth and back movement of the ring 4 on the pintle hook 5.

As a result, the trailer 2 is hitched to the truck 1.

In order to unhitch the trailer 2 of FIG. 1 from the truck 1 of the same Figure, the following steps are carried out in sequence:

the supply motor 30 with pressurized air is interrupted while motor 25 is activated to position the locking member 26 and the block 31 in their position shown in FIG. 3, whereby the ring 4 is unlocked;

the cylinder 15 is fully extended to lift the draw pole 3 above the pintle hook 5 (see FIG. 3);

the truck is moved forwardly while the pole 3 (including the ring 4) slides on the arcuate surface to thereby disengage the ring 4 from the pintle hook 5;

the cylinder 15 can then be fully retracted and the rear tube section 17 eventually removed through removal of the pin 18.

Of course, the cylinder 15 as well as the air motors 25 and 30 can be controlled from the cabin of the truck 1, whereby the trailer 2 can be hitched and unhitched without the driver leaving his seat.

Also, the motor 25 and 30 can advantageously be supplied by the same pressurized air source as the brakes of the truck 1. As an air pressure gauge is mounted in the cabin of the truck to indicate reduction in pressure of the air supplying the brakes, such a gauge also indicates reduction in pressure of the air supplying the motors 30 to thereby increase safety in using the trailer hitch of the present invention. In all cases the air motor 25 safely locks the ring 4 on the hook 5 as described above as long as it is not supplied with air adequately pressurized.

Although the present invention has been described hereinabove by means of a preferred embodiment thereof, such a preferred embodiment can be modified at will, within the scope of the appended claims, without changing or altering the nature of the present invention.

What is claimed is:

1. A trailer hitch for hitching to a motor vehicle a trailer having a draw pole with a first end attached to the trailer and with a second end which is free, the trailer hitch comprising:

a first coupling member secured to the second end of the draw pole, the first coupling member comprising a coupling ring secured to the second end of the draw pole;

a second coupling member fixedly attached to the motor vehicle and engageable with the first coupling member to hitch the trailer to the said motor vehicle, the second coupling member comprising an upwardly projecting pintle hook with an upper free end fixedly attached to the said motor vehicle;

an arm pivotally mounted on the motor vehicle through a substantially horizontal pivot, said arm having a free end distant from the said pivot and provided with means for supporting the said draw pole, the substantially horizontal pivot being lower than the said pintle hook;

said draw pole supporting means comprises the free end of the pivoting arm formed with an arcuate, convex surface for engaging the underside of said draw pole arm rotating means for rotating said pivoting arm about a substantially horizontal pivot, the arm rotating means comprising means for rotating the said arm about a pivot in a first direction of rotation with the draw pole supported by the said arcuate, convex surface to lift the coupling ring until the same is higher than the upper free end of the pintle hook, whereby said coupling ring may be positioned above the pintle hook by moving the motor vehicle toward the trailer with the draw pole sliding on the arcuate surface;

said arm rotating means also comprising means for rotating said pivoting arm about the substantially horizontal pivot in a second direction of rotation opposite to the first rotation direction with the draw pole supported by the arcuate surface when the coupling ring is above the pintle hook in order to lower the coupling ring on the pintle hook and thereby engage the said ring with the said pintle hook; and whereby, in operation, said pivoting arm is rotated about said pivot with the free end of the arm supporting the draw pole in order to control in height the position of the pole, the second end and the first coupling member and thereby enable engagement of the said first coupling member with the second coupling member.

2. The trailer hitch of claim 1, wherein the said arm rotating means further comprises means for rotating the pivoting arm about the substantially horizontal pivot in the first rotation direction with the draw pole supported by the arcuate surface, when the said coupling ring is engaged with the pintle hook, to lift the coupling ring until it is higher than the upper free end of the pintle hook, whereby moving the motor vehicle away from the trailer with the draw pole sliding on the said arcuate surface unhitch the said trailer from the motor vehicle.

3. The trailer hitch of claim 2, further comprising means for locking the said coupling ring on the pintle hook, as well as means for preventing forth and back movement of the coupling ring with respect to the said pintle hook.

4. The trailer hitch of claim 1, comprising means for laterally guiding the coupling ring toward the hook to position said ring above said hook as the motor vehicle moves toward the trailer with the draw pole sliding on the convex, arcuate surface.

5. The trailer hitch of claim 4, in which the said ring guiding means comprises two vertical surfaces converging toward the pintle hook.

6. The trailer hitch of claim 1, further comprising means for locking the said coupling ring on the pintle hook, and means for preventing forth and back movement of the coupling ring with respect to the said pintle hook.

7. The trailer hitch of claim 1, in which said arm rotating means comprises remotely operable means for rotating said pivoting arm about the said substantially horizontal pivot.

8. The trailer hitch of claim 7, wherein said pivoting arm comprises a second end distant from the said pivot, and wherein said remotely operable arm rotating means comprises a hydraulic cylinder with one end connected to the second end of the pivoting arm and with another end connected to the vehicle.

9. The trailer hitch of claim 8, further comprising means for locking said coupling ring on the pintle hook, and means for preventing forth and back movement of the coupling ring with respect to the said pintle hook.

10. The trailer hitch of claim 1, in which said pivoting arm is made of first and second tube sections with cross sections of different area, the first tube section comprising said free end of the pivoting arm with said means for supporting the draw pole and having a second end which can be fitted within one end of the second tube section pivotally mounted on the motor vehicle through the said substantially horizontal pivot, said pivoting arm further comprising means for locking the second end of the first tube section into the said one end of the second tube section and for unlocking the second end of the first tube section from the said one end of the second tube section, whereby the first tube section can be installed on and removed from the said second tube section.

11. The trailer hitch of claim 10, wherein the said draw pole supporting means comprises arcuate plate means defining a convex surface for engaging the underside of the draw pole, said arcuate plate means being mounted on the said free end of the first tube section.

12. The trailer hitch of claim 10, in which the first and second tube sections are square in cross section.

* * * * *